United States Patent
Baker et al.

(10) Patent No.: US 8,571,077 B2
(45) Date of Patent: Oct. 29, 2013

(54) SYSTEM AND METHOD FOR LASER MODULATION

(75) Inventors: Christopher Baker, Maumee, OH (US); Sudirukkuge Tharanga Jinasundera, Perrysburg, OH (US); Weixin Li, Waterville, OH (US)

(73) Assignee: First Solar, Inc., Perrysburg, OH (US)

( * ) Notice: Subject to any disclaimer, the term of this patent is extended or adjusted under 35 U.S.C. 154(b) by 0 days.

(21) Appl. No.: 13/220,075

(22) Filed: Aug. 29, 2011

(65) Prior Publication Data

US 2012/0051376 A1    Mar. 1, 2012

Related U.S. Application Data

(60) Provisional application No. 61/378,766, filed on Aug. 31, 2010.

(51) Int. Cl.
*H01S 3/10* (2006.01)

(52) U.S. Cl.
USPC ............. 372/26; 372/28; 372/25; 372/24; 372/29.015; 372/38.02; 372/38.07

(58) Field of Classification Search
USPC ............. 372/26, 28, 25, 24, 29.015, 38.02, 372/38.07
See application file for complete search history.

(56) References Cited

U.S. PATENT DOCUMENTS

| | | | |
|---|---|---|---|
| 5,262,636 A * | 11/1993 | Rink | 250/221 |
| 5,436,027 A | 7/1995 | Offer | |
| 5,567,207 A | 10/1996 | Lockman et al. | |
| 5,593,606 A | 1/1997 | Owen et al. | |
| 5,959,655 A * | 9/1999 | Maruo et al. | 347/246 |
| 5,990,444 A | 11/1999 | Costin | |
| 6,002,099 A | 12/1999 | Martin et al. | |
| 6,108,025 A | 8/2000 | Li et al. | |
| 6,819,972 B1 | 11/2004 | Martin et al. | |
| 7,046,267 B2 | 5/2006 | Franklin et al. | |
| 7,167,194 B2 | 1/2007 | Assa et al. | |
| 7,348,516 B2 | 3/2008 | Sun et al. | |
| 7,394,479 B2 | 7/2008 | Assa et al. | |
| 7,611,966 B2 | 11/2009 | Li et al. | |
| 7,718,554 B2 | 5/2010 | Yoo et al. | |
| 7,750,268 B2 | 7/2010 | Smart | |
| 2003/0105457 A1 | 6/2003 | Mrochen et al. | |
| 2005/0087522 A1* | 4/2005 | Sun et al. | 219/121.71 |
| 2006/0160332 A1 | 7/2006 | Gu et al. | |
| 2008/0094640 A1 | 4/2008 | Cordingley et al. | |
| 2009/0016388 A1* | 1/2009 | Gu et al. | 372/25 |
| 2010/0089882 A1 | 4/2010 | Tamura | |
| 2010/0197116 A1 | 8/2010 | Shah et al. | |
| 2011/0100966 A1 | 5/2011 | Nagatomo et al. | |
| 2011/0127241 A1 | 6/2011 | Rumsby | |

FOREIGN PATENT DOCUMENTS

WO    WO 2009/141584 A1    11/2009

OTHER PUBLICATIONS

F.E. Livingston et al.; "Tailoring Light Pulse Amplitudes for Optimal Laser Processing and Material Modification"; Applied Surface Science 253; 2007; pp. 8015-8021.

* cited by examiner

*Primary Examiner* — Kinam Park
(74) *Attorney, Agent, or Firm* — Dickstein Shapiro LLP

(57) ABSTRACT

A laser system can include a laser and a laser output modulator to modulate the output of the laser.

11 Claims, 4 Drawing Sheets

SYSTEM AND METHOD FOR LASER MODULATION

This application claims priority under 35 U.S.C. §119(e) to Provisional Application No. 61/378,766, filed on Aug. 31, 2010, which is hereby incorporated by reference in its entirety.

TECHNICAL FIELD

The present invention relates to a laser system and method of controlling a laser.

BACKGROUND

A laser can be used to remove material from a surface of an object. During the removal procedure, the power density of the laser beam can vary from position to position on the object (based on the incidence angle of the beam to the objective). In areas where the power density is too high, unnecessary damage to the object can occur. A system allowing for a uniform, non-destructive power density would be desirable.

DETAILED DESCRIPTION

Figure 1:
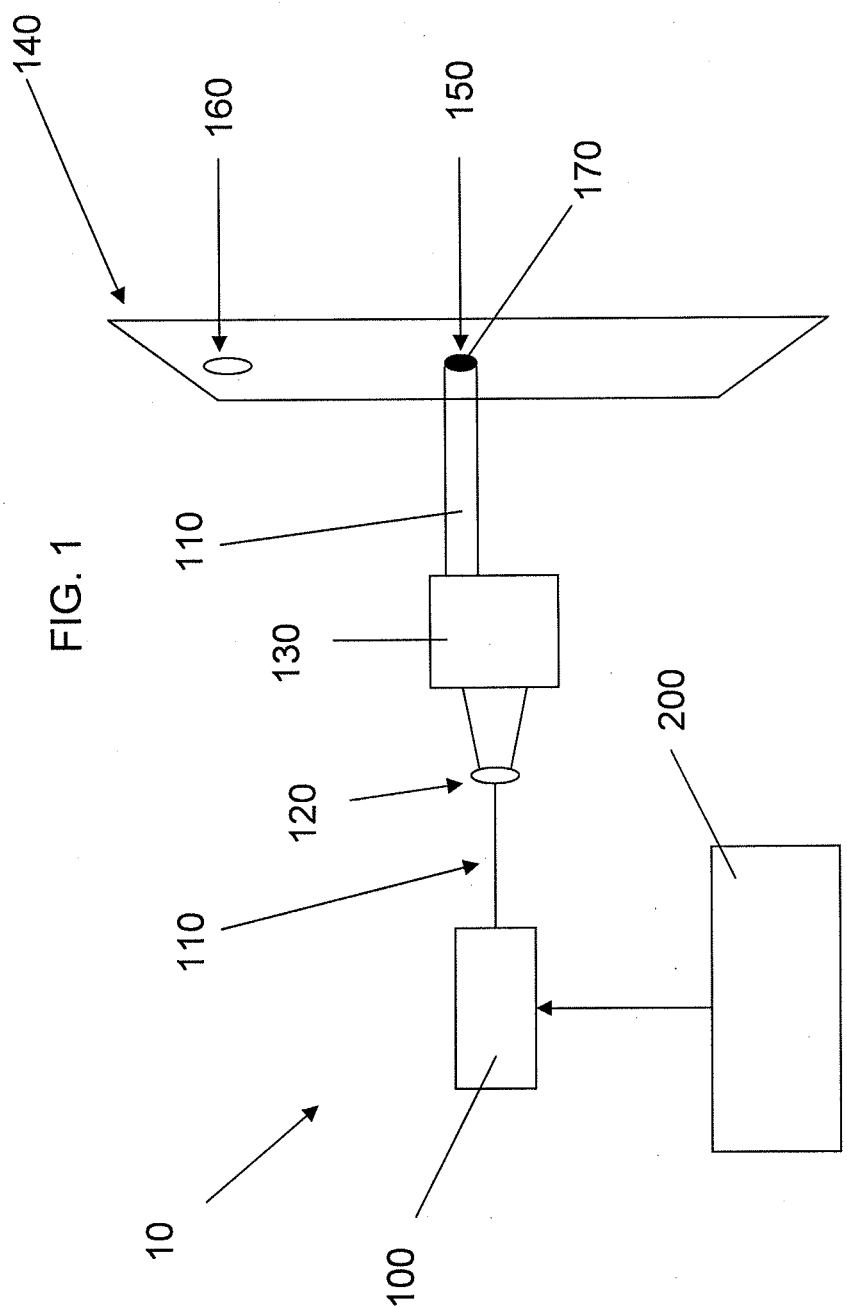
FIG. 1 is a schematic of a laser system.

A laser can be used to remove a portion of a material coating from a surface of an object. For example, a laser can be used to create scribe lines in a semiconductor material on a substrate, for example, to define a plurality of distinct photovoltaic cells or to create a material-free edge or perimeter on the substrate. The preference may be to avoid physically contacting the coated areas of the substrate while processing. Thus it may be desirable to remove one or more portions of coating from one or more edges of the substrate to create one or more coating-free edges. The coating-free edges can facilitate processing of the substrate by eliminating potential contamination of the coated areas from inadvertent touching. It may also be desirable to create one or more trenches within one or more layers of coating formed on the substrate. Various materials may be deposited within the trenches, including, for example, any suitable conductive material (e.g., copper) or a dielectric material (e.g., tin oxide). In the case of a photovoltaic module, these trenches can be used to electrically interconnect (and thus define) the multiple photovoltaic cells within the module.

Current laser scribe systems can include three-axis Galvano motor-based scanning heads. Such devices require relatively high laser power to achieve desired scribe quality. They also may require isolation on the edge of the module due to the laser beam's elliptical shape at the plate edge. Due to this elliptical shape of the laser beam spot, laser power density differs substantially between the center and edges of the plate. Higher damage may thus occur as a result of the higher power density at the center of the plate compared to the edge of the plate. Thus, the active area of the module may be reduced substantially in the center of the module compared to the edge of the module. This effect can be mitigated by manipulating the laser output power and laser pulsing frequency in real-time during scribing of the module. Real-time adjustments may also result in greater precision in the scribing process altogether.

A laser scribing system may include a diode-pumped solid-state laser (DPSS). Operation of the diode-pumped solid-state laser may involve pumping a solid gain medium, for example, a neodymium-doped yttrium orthovanadate (Nd:YVO$_4$), neodymium-doped yttrium aluminium garnet (Nd:YAG), or neodymium-doped yttrium lithium fluoride (Nd:YLF) with a laser diode. The laser diode may be part of an array. The diode array may be one-dimensional (e.g., a laser diode bar) or multi-dimensional (e.g., stacked laser diode bars). The laser diode may be connected to a power source for supplying current, and thereby driving the system.

Laser output is proportional to the input pumping energy. Thus the laser output power can be modulated by changing the input pumping power created by the laser diode. For example, a modulation apparatus may be connected between the current source and the laser diode. The modulation apparatus may be connected to a central controller or computer, which may direct modulation of the signal output by the power source to the laser diode. The input signal for the laser diode may be modulated using any signal parameter, including, for example, phase, frequency, or amplitude.

DPSS lasers typically have an input to control diode pump current and two voltage inputs to control the pumping diode modules independently. The average response or rise time for these pins is about 15 μs to about 20 μs. In a typical scribing process, about 10,000 to about 15,000 laser pulses are needed to make one scribe line with a total processing time of about 110 ms. Based on the diode/pin response time, it is possible to modulate the diode current fast enough during formation of the scribe line to level-out the intensity change or the power density across the single scribe. Because the current modulation cannot be achieved through a serial communication port (e.g., an RS-232 or Recommended Standard 232 port), a synchronous amplitude-modulated signal must be generated to drive the input pins.

This technique can be used to achieve up to 40% modulation of the laser output power without changing any properties of the laser beam parameters. Modulation in the range of about 20% to about 30% may be sufficient to achieve desired results. By doing this, a uniform scribe line at the top, bottom, and center of a substrate surface may be obtained. Further, this technique can be used to overcome scribe quality issues due to upstream process variation, especially that caused by plate shape issues. It should be appreciated that the current laser system can be used to control laser removal of any laser-ablatable material from any suitable object while controlling the laser output to prevent damage to the coated object.

In one aspect, a laser system can include a laser, a laser beam positioner configured to direct a laser beam emitted from the laser to a target, and a laser output modulator configured to modulate the laser output. The laser output modulator can be configured to modulate the laser output based on the area of a laser beam spot created at a surface of the target. The laser beam positioner can include a laser scan head configured to move the laser beam relative to the surface of the object. The laser output modulator can be configured to modulate laser power output of the laser based on the area of a laser beam spot created at the interface of the laser beam and the surface of the object. The laser output modulator can be configured to decrease the laser output power based on a decrease in the area of the laser beam spot. The laser output modulator can be configured to modulate laser pulsing frequency based on the area of the laser beam spot created at the interface of the laser beam and the surface of the object.

The laser can include a diode pumped solid state laser. The laser output modulator can be configured to modulate laser output by controlling a diode pump current of the laser. The laser output modulator can be configured to increase or decrease the laser power output by about 0% to about 40% based on the area of the laser beam spot. The laser output modulator can be configured to increase or decrease the laser power output by about 10% to about 30% based on the area of the laser beam spot. The laser output modulator can be configured to increase or decrease the laser power output by about 20% to about 25% based on the area of the laser beam spot. The laser system can include a target positioner configured to position a target proximate to the laser.

In another aspect, a method of controlling a laser can include directing a laser beam having a first laser output from a laser to a first laser beam spot position created on a surface of a target. The method can include redirecting the laser beam from the first laser spot to a second laser beam spot position on the surface of the target. The method can include adjusting the first laser output to a second laser output based on the area of the second laser beam spot position compared to the area of the first laser beam spot position.

Adjusting the first laser output can include adjusting the laser power output. Adjusting the laser power output can include controlling a diode pump current input to a diode pumped solid state laser. Adjusting the laser power output can include increasing the laser power output when the second laser beam spot position has a greater area than the first laser beam spot position. Adjusting the laser power output can include decreasing the laser power output when the second laser beam spot position has a smaller area than the first laser beam spot position.

Adjusting the first laser output can include maintaining substantially the same laser power density at the second laser beam spot as at the first laser beam spot. Adjusting the first laser output can include adjusting a laser pulsing frequency of the laser. Adjusting the first laser output can occur before the laser beam is redirected from the first laser beam spot position to the second laser beam spot position. Adjusting the first laser output can occur after the laser beam is redirected from the first laser beam spot position to the second laser beam spot position. Adjusting the first laser output can occur while the laser beam is redirected from the first laser beam spot position to the second laser beam spot position.

The target can include a substrate having a surface at least partially coated with a laser-ablatable material. Directing the laser beam to the first laser beam spot position can result in removal of a portion of the coating at the first laser beam spot position. Redirecting the laser beam to the second laser beam spot position can result in removal of a portion of the coating at the second laser beam spot position. Directing the laser beam to the first laser beam spot position and redirecting the laser beam to the second laser beam spot position can cause substantially no physical change to the substrate.

The first laser beam spot position can have a smaller area than the second laser beam spot position. The target can include a substrate including a surface at least partially coated with a laser-ablatable material. The laser-ablatable material can include a semiconductor material. The laser-ablatable material can include cadmium telluride.

Referring now to FIG. 1, laser system 10 can include a laser 100. Laser 100 can include any suitable laser which can be configured to emit a beam capable of removing a material coated on the surface of an object, such as substrate 140. The laser can include a diode pumped solid state laser. The laser can have an output such as laser beam 110, which can have various characteristics. For example, laser beam 110 can have a laser power. Additionally, laser beam 110 can have a pulsing frequency, which can allow it to be emitted in pulses rather than continuously. Full laser power may be more than 25 W, for example, about 27 W. Ideal reduced power for the center of the module can be less than about 25 W, for example, 20 W. Laser power at the edge of the plate may be about 25 W, with a frequency range of about 50 kHz to about 300 kHz (e.g., with a low frequency at the center of the plate and higher pulsing frequency at the edge of the plate). Laser beam 110 can be directed toward substrate 140 through any suitable optical path, which can focus, expand, collimate, direct, redirect, reflect, filter, or otherwise transform laser beam 110 in any suitable manner. The optical path may include one or more lenses or mirrors of any suitable combination and configuration to direct laser beam 110 to a coated surface of substrate 140.

Figure 2:
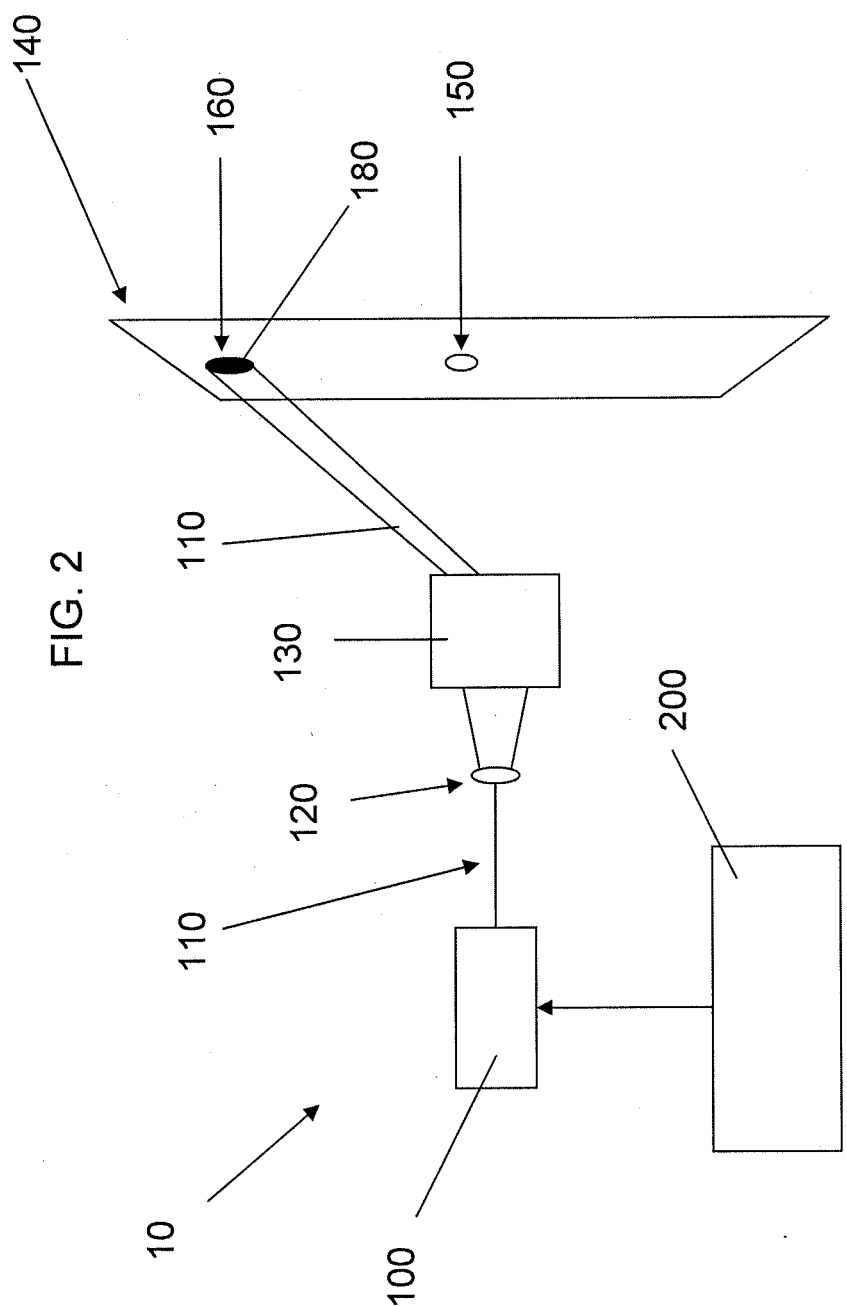
FIG. 2 is a schematic of a laser system.
Figure 3:
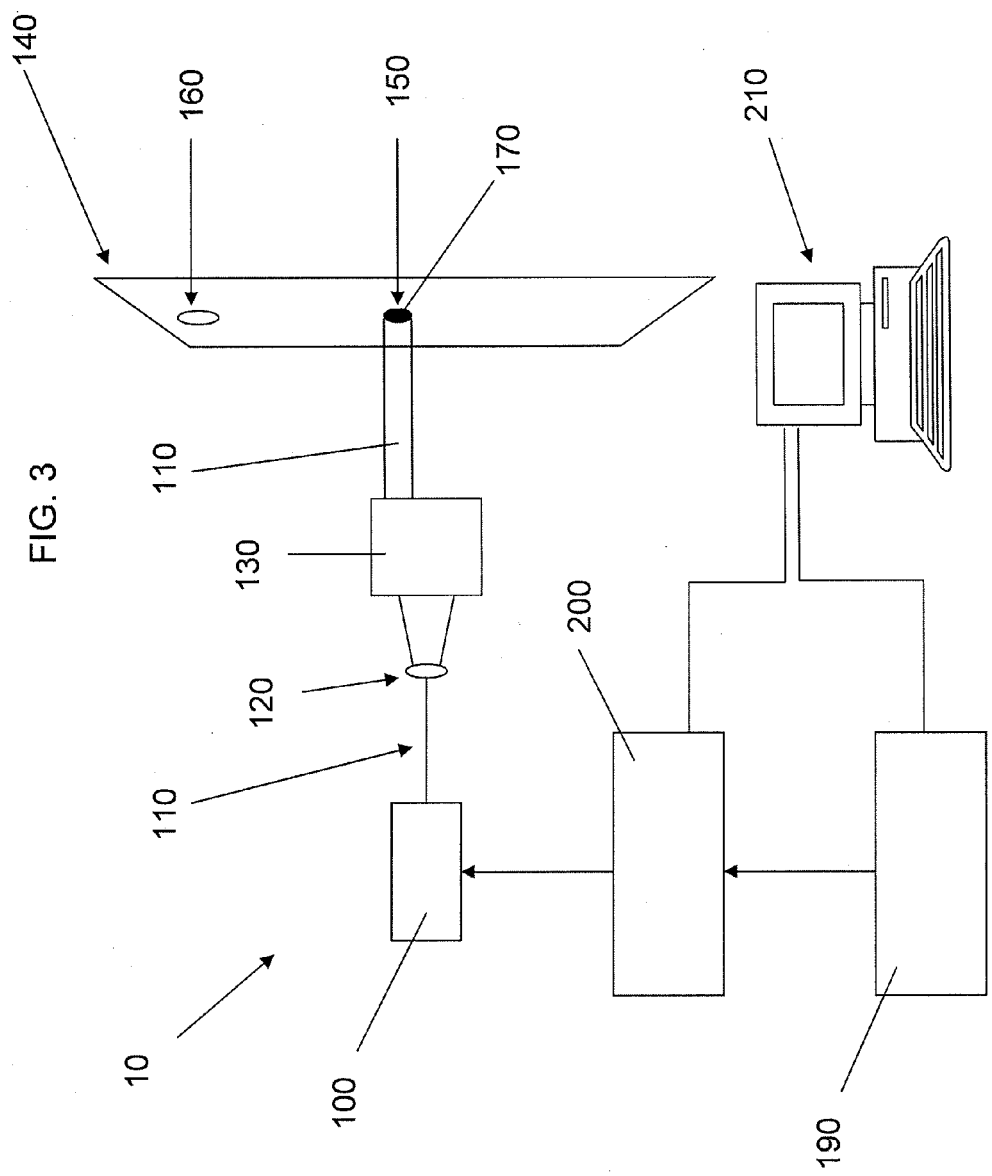
FIG. 3 is a schematic of a laser system.

For example, laser system 10 can include scan head 130 configured to transform and direct laser beam 110 to a position on the surface of an object such as substrate 140. Scan head 130 can continuously or stepwise move laser beam 110 relative to a surface of substrate 140 such that laser beam 110 traces any suitable path on the surface of substrate 140. Laser system 10 may also include beam expander 120 which can be a separate component from scan head 130 or which can be integrated into scan head 120. It should be noted that laser beam 110 between scan head 130 and substrate 140 is depicted in FIGS. 1-3 as having a large diameter, however, the size and shape of laser beam 110 is for illustrative purposes only. Laser beam 110 can have any suitable size or shape.

Laser beam 110 from laser 100 in laser system 10 can interface substrate 140 to form a laser beam spot at any one or more of many laser beam spot positions on the surface of substrate 140. For example, during a laser scribe process, laser beam 110 might be directed to hundreds, thousands, or more laser beam spot positions on the surface of substrate 140. Indeed, as laser beam 110 continuously scans the surface of substrate 140, it can be considered to have been directed to an infinite number of points on the surface of substrate 140. As a practical matter, laser beam 110 may be considered to have targeted tens of thousands of unique positions on the surface of substrate 140. For the sake of clarity only two such positions are depicted in FIG. 1: first laser beam spot position 150 and second laser beam spot position 160. As shown in FIG. 1, laser beam 110 can be directed at first laser beam spot position 150 to create first laser beam spot 170. First laser beam spot 170 defines an area on the surface of substrate 140, depicted by the shaded area. Laser system 10 also may include laser output modulator 200, which will be discussed in greater detail below.

Referring now to FIG. 2, laser beam 110 is redirected by scan head 130 from first laser beam spot position 150 on the surface of substrate 140 to second laser beam spot position 160 to eliminate first laser beam spot 170 and create second laser beam spot 180. Like first laser beam spot 170, second laser beam spot 180 defines an area (depicted as shaded) on the surface of substrate 140. While first laser beam spot 170 was substantially in-line with laser beam 110 from scan head 130, laser beam spot 180 is created by a more oblique path for laser beam 110 from scan head 130. Typically, an in-line path for laser beam 110 resulting in first laser beam spot 170 can be aligned substantially with a center portion of substrate 140, while an oblique path for laser beam 110 resulting in second laser beam spot 180 intersects substrate 140 closer to the edge of substrate 140.

Referring now to FIG. 3, laser beam is redirected from second laser beam spot position 160 back to first laser beam spot position 150 to create first laser beam spot 170. Because the area of first laser beam spot position 150 is smaller than the area of second laser beam spot position 160 (and, correspondingly, the area of first laser beam spot 170 is smaller than the area of second laser beam spot 180), if the laser output is held constant at both positions, the laser power density at first laser beam spot 170 can be significantly greater than the laser power density at second laser beam spot 180. Laser output modulator 200 can modulate the laser output to hold laser power density substantially constant to prevent damage to the underlying substrate 140 at first laser beam spot position 150.

Laser output modulator 200 can modulate the laser output by controlling current source 190. System 10 may include a current source 190 for supplying current to laser 100. Laser output modulator 200 may be positioned between and connected to laser 100 and current source 190. Laser output modulator 200 may be configured to modulate a current signal output by current source 190 for laser 100. The current output from current source 190 into laser output posulator 200 may be modulated to achieve a desired power output and frequency for the laser pulse. The modulation may reduce the average laser output, including laser power, of system 10. The current signal may be modulated according to any desired parameter, including, for example, amplitude, phase, or frequency. The current signal may be modulated to achieve modulation of the laser pulse of more than about 10%, more than about 20%, more than about 30%, more than about 40%, less than about 80%, less than about 70%, or less than about 60%.

The degree of modulation required can be based on any suitable variable, for example, the area of laser beam spots to be scanned on the surface of substrate 140. A look-up table can include the area (and corresponding power density) of a laser beam spot at a given set of coordinates on the surface of substrate 140, at a given laser output. Before the laser beam 110 is directed or redirected to the new laser beam spot, laser output modulator can modulate the laser output as appropriate based on the coordinates of the next laser beam spot. For example, if laser beam 110 is redirected from second laser beam spot position 160 to first laser beam spot position 150, with a first laser beam spot 170 at first laser beam spot 150 having a smaller area (and thus higher laser power density at a given laser output), laser output modulator 200 and/or associated controller 210 can decrease the laser output to maintain the laser power density at first laser beam spot 170 in line with the laser power density at laser beam spot 180. In this way, substrate 140 can be protected from damage caused by an excessive laser power density.

Referring to FIG. 3, controller 210 may be connected to current source 190. Controller 210 may be configured to direct current source 190 to direct a desired current signal. Controller 210 may be configured to dictate the amount of current that current source 190 may provide, and may be further configured to cut off the current signal output by current source 190. Controller 210 may be connected to laser output modulator 200. Controller 210 may be configured to initiate a modulation sequence, and may determine how the current signal may be modulated. Controller 210 may be configured to determine the appropriate modulation based on a stored value for the desired power of the output laser pulse. Controller 210 may include a microprocessor, a computer, computer network, or central server. Controller 210 may contain an interface to permit a user to direct various aspects of system 10, including, for example, the value and duration of the current signal output by current source 190, the duration and type of modulation for the current signal, or the frequency of the laser pulse. Controller 210 may be connected to laser output modulator 210 or current source 190 using any suitable means, including, for example, any suitable means of wireless or hardwire communication.

Figure 4:
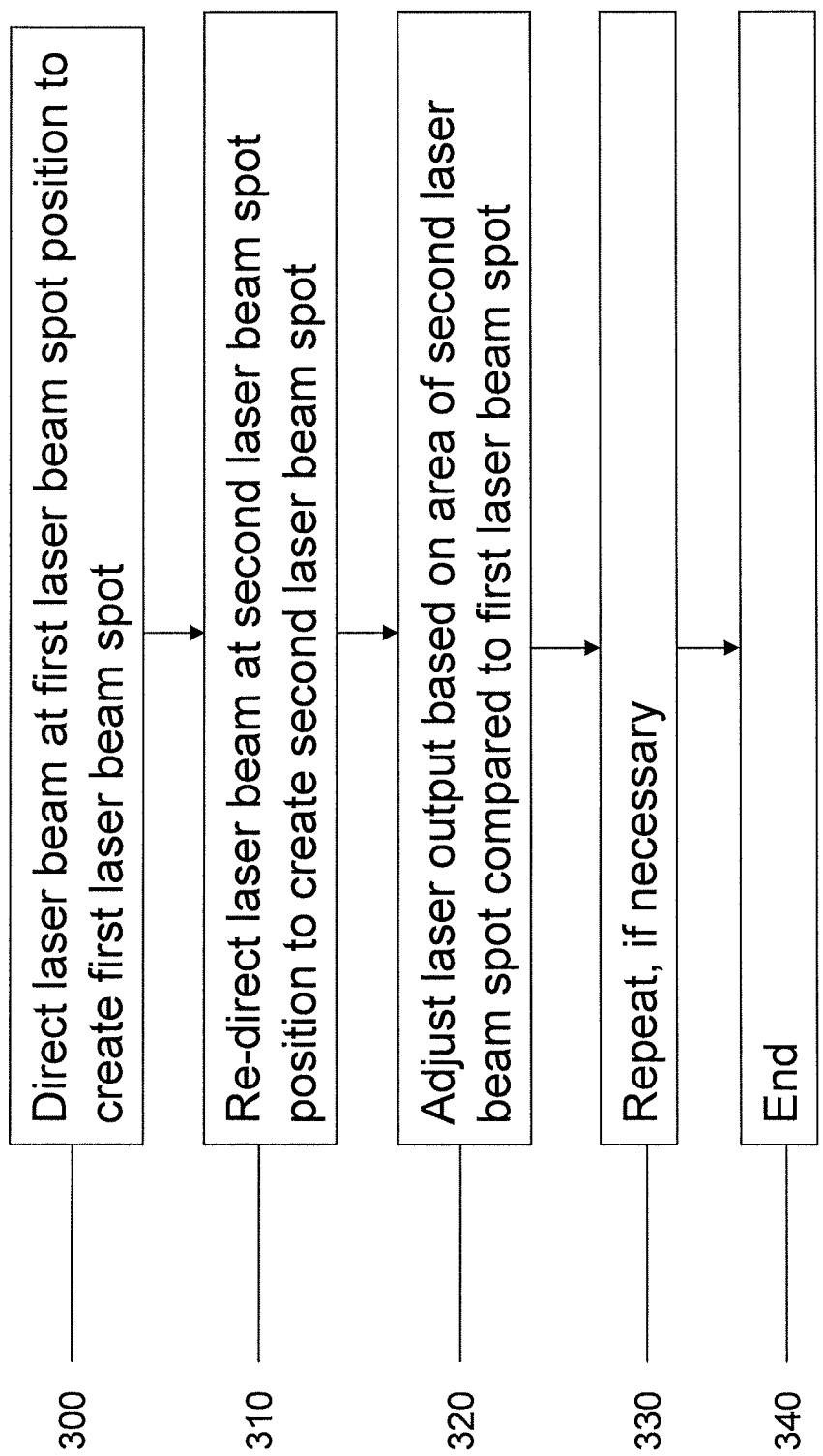
FIG. 4 is a flowchart illustrating the steps in a laser control process.

Referring now to FIG. 4 a basic process for controlling a laser is described. At step 300 a laser beam is directed at a first laser beam spot position on a surface of a target. A first laser beam spot is created where the laser beam interfaces the surface of the object. At this point the laser is set to an initial laser output, which can be defined by the laser power and/or pulsing frequency. When the laser is ready to be repositioned (for example, when the coating material at the first laser beam spot is substantially removed), the laser beam can be redirected (by any suitable means) to a second laser beam spot position on the surface of the object, at step 310. A second laser beam spot is created where the laser beam interfaces the surface of the object at the second laser beam spot position. The second laser beam spot can have an area different from the first laser beam spot. If the area of the second laser beam spot is smaller than the area of the first laser beam spot, and the laser output is held constant, the laser power density at the second laser beam spot can be greater than the power density at the first laser beam spot. If the laser power density at the second laser beam spot is too great, damage to the object may result. Therefore, based on a comparison of the area of the second laser beam spot to the area of the first laser beam spot, the laser can be adjusted at step 320 to a second laser output, which can hold the laser power density substantially constant, even between laser beam spots of different areas. The process can be repeated at step 330 from one laser beam spot to the next, until the requirements of the object scan are fulfilled, at which point the process can end at step 340.

The embodiments described above are offered by way of illustration and example. It should be understood that the examples provided above may be altered in certain respects and still remain within the scope of the claims. It should be appreciated that, while the invention has been described with reference to the above preferred embodiments, other embodiments are within the scope of the claims.

What is claimed is:

1. A laser system comprising:
a laser;
a laser beam positioner configured to direct a laser beam emitted from the laser to at least a first laser beam spot at a first location and a second laser beam spot at a second location spaced from the first location on a target surface, wherein the first and second laser beam spots have different areas; and
a laser output modulator configured to modulate a laser power output from a first laser output level when the laser is directed at the first laser beam spot, to a second laser output level when the laser beam is directed at the second laser beam spot, such that a laser power density is constant between the first laser beam spot and the second laser beam spot.

2. The laser system of claim 1, wherein the laser output modulator is configured to modulate the laser power output based on the area of each laser beam spot created at the target surface.

3. The laser system of claim 1, wherein the laser beam positioner comprises a laser scan head configured to move the laser beam relative to the target surface.

4. The laser system of claim 2, wherein the laser output modulator is configured to decrease the laser power output level when the positioner moves the laser beam from the first laser beam spot to the second laser beam spot, in response to a smaller area of the second laser beam spot compared to the first laser beam spot.

5. The laser system in any one of claims 1-3 or 4, wherein the laser output modulator is configured to modulate a laser pulsing frequency based on the area of each laser beam spot created at the target surface.

6. The laser system of any one of claims 1-3 or 4, wherein the laser comprises a diode pumped solid state laser.

7. The laser system of any one of claims 1-3 or 4, wherein the laser output modulator is configured to modulate the laser power output by controlling a diode pump current of the laser.

8. The laser system of claim 2, wherein the laser output modulator is configured to increase or decrease the laser power output level by about 0% to about 40% based on the area of each laser beam spot.

9. The laser system of claim 8, wherein the laser output modulator is configured to increase or decrease the laser power output level by about 10% to about 30% based on the area of each laser beam spot.

10. The laser system of claim 9, wherein the laser output modulator is configured to increase or decrease the laser power output level by about 20% to about 25% based on the area of each laser beam spot.

11. The laser system of any one of claim 1-3,4 or 8-10, further comprising a target positioner configured to position the target surface proximate to the laser.

\* \* \* \* \*